United States Patent
Takehana et al.

(10) Patent No.: US 6,432,557 B2
(45) Date of Patent: Aug. 13, 2002

(54) METAL MATRIX COMPOSITE AND PISTON USING THE SAME

(75) Inventors: Toshihiro Takehana; Akihiro Katsuya; Tohru Shiraishi, all of Yokohama (JP)

(73) Assignee: NHK Spring Co., Ltd., Yokohama (JP)

(*) Notice: Subject to any disclaimer, the term of this patent is extended or adjusted under 35 U.S.C. 154(b) by 0 days.

(21) Appl. No.: 09/827,606

(22) Filed: Apr. 5, 2001

Related U.S. Application Data (63) Continuation of application No. PCT/JP00/05373, filed on Aug. 10, 2000.

(30) Foreign Application Priority Data

Aug. 10, 1999 (JP) ............................................ 11-226359
Mar. 13, 2000 (JP) ........................................ 2000-069001

(51) Int. Cl.[7] .......................... B32B 5/00; B32B 15/01; B32B 15/18; B32B 15/20; F02F 3/00
(52) U.S. Cl. ...................... 428/614; 428/653; 428/682; 428/293.1; 92/172
(58) Field of Search ................................ 428/614, 682, 428/293.1, 653; 442/6, 23; 92/172

(56) References Cited

U.S. PATENT DOCUMENTS

| | | | |
|---|---|---|---|
| 4,927,712 A | * | 5/1990 | Lhymn et al. |
| 4,962,003 A | * | 10/1990 | Lhymn et al. |
| 5,001,961 A | * | 3/1991 | Spain |
| 5,523,171 A | * | 6/1996 | Yoon et al. |

FOREIGN PATENT DOCUMENTS

| | | | |
|---|---|---|---|
| JP | 03 183 742 | * | 4/1984 |
| JP | 59 067 335 | * | 4/1984 |
| JP | 59-220273 | | 12/1984 |
| JP | 61-28006 | | 6/1986 |
| JP | 61-231130 | | 10/1986 |
| JP | 62-33730 | | 2/1987 |
| JP | 8-30250 | | 3/1996 |
| JP | 10-53842 | | 2/1998 |
| JP | 10 053 842 | * | 2/1998 |

* cited by examiner

*Primary Examiner*—Deborah Jones
*Assistant Examiner*—Jason Savage
(74) *Attorney, Agent, or Firm*—Frishauf, Holtz, Goodman & Chick, P.C.

(57) ABSTRACT

A part of a piston is composed of a metal matrix composite. The metal matrix composite is composed of a matrix of a light metal alloy and reinforcements formed of metallic fibers mixed in the matrix. The reinforcements are formed of an alloy that consists mainly of Fe and Cr and contains Al and/or Si. The Cr content and the Al and/or Si content of the reinforcements range from 5 to 30% and from 3 to 10%, respectively. The fiber diameter of the reinforcements ranges from $\phi 20\,\mu m$ to $\phi 100\,\mu m$. The reinforcements are formed by the melt extraction method and have irregular peripheral surfaces. Solution-treatment of the metal matrix composite is carried out within a temperature range from 470° C. to 500° C. such that formation of intermetallic compounds is restrained.

13 Claims, 9 Drawing Sheets

METAL MATRIX COMPOSITE AND PISTON USING THE SAME

CROSS REFERENCE TO RELATED APPLICATIONS

This is a Continuation Application of PCT Application No. PCT/JP00/05373, filed Aug. 10, 2000, which was not published under PCT Article 21(2) in English.

This application is based upon and claims the benefit of priority from the prior Japanese Patent Applications No. 11-226359, filed Aug. 10, 1999; and No. 2000-069001, filed Mar. 13, 2000, the entire contents of both of which are incorporated herein by reference.

BACKGROUND OF THE INVENTION

The present invention relates to a metal matrix composite, including a light metal alloy, e.g., aluminum alloy, magnesium alloy, etc., as a matrix (base metal), and a piston using the same.

Conventionally, steel materials have been used as materials for mechanical element components. However, light metal alloys, such as Al (aluminum) alloy, Mg (magnesium) alloy, etc., are used for components that require reduction in weight. For some of components that require high-temperature strength, as well as reduction in weight, moreover, a metal matrix composite (abbrev. as MMC) may be used in the case where required characteristics cannot be obtained with use of a simple light metal alloy with a low melting point (i.e., with low high-temperature strength) or if the required characteristics cannot be obtained with use of a simple light metal alloy with poor wear resistance. The metal matrix composite is composed of a metallic matrix and reinforcements. Carbon fibers or ceramic fibers, such as SiC (silicon carbide), $Al_2O_3$ (alumina), etc., are used for the reinforcements, for example.

Components such as automotive parts and aircraft parts of which the weight is closely associated with the fuel-efficiency eagerly require reduction in weight. Materials for the components of this type are being changed from the conventional steel over to light metal alloys, such as Al alloy, Mg alloy, etc. To meet this requirement, materials for internal-combustion engines that exposed to high temperature and their peripheral parts (engine parts such as pistons, cylinder heads, cylinder blocks, connecting rods, etc.) are being changed over to light metal alloys. With the progress of development of higher-output internal-combustion engines, however, high-temperature strength and wear resistance have ceased to be ensured with use of a simple light metal alloy with a low melting point (i.e., with low high-temperature strength) or a simple light metal alloy with poor wear resistance. The following is a description of a piston for a diesel engine of an automobile as an example.

Direct-injection engines have recently been becoming prevailing. The load on the side of the combustion chamber of the piston is expected to increase as the development of higher-output versions will advance hereafter. The combustion chamber for forming eddies of air called swirls is formed in an end face of the piston. Since the edge (lip portion) that requires machining for finishing is thin-walled, in particular, it is hard to secure satisfactory fatigue strength in a high-temperature zone (e.g., at 300° C. or thereabout) with use of conventional aluminum alloys (AC8A, etc.) for castings. The following is a description of the chemical ingredients of AC8A. In this specification, the chemical ingredients of the alloys are given by % by weight unless otherwise specified.

Cu: 0.8 to 1.3
Si: 11.0 to 13.0
Mg: 0.7 to 1.3
Zn: 0.15 or less
Fe: 0.8 or less
Mn: 0.15 or less
Ni: 0.8 to 1.5
Ti: 0.20 or less
Pb: 0.05 or less
Sn: 0.05 or less
Cr: 0.10 or less
Al: Remainder Composites that use these Al alloys as their base metal (matrices) may possibly be subjected to surface treatment to improve their high-temperature fatigue strength. Since the effect of the strength improvement by the surface treatment is small, however, a metal matrix composite (MMC) is expected to be used.

Feasible reinforcements for the metal matrix composite include metallic fibers, carbon fibers, and ceramic fibers, and besides, porous structures and whiskers (crystal whiskers) formed of these materials, etc. Under the present conditions, fibers that are used as the reinforcements of the metal matrix composite are ceramic fibers, such as SiC, $Al_2O_3$, etc., and metallic fibers have not reached the level of practical use yet. This is so because no manufacturing technique has been established yet for metallic fibers of fiber diameters (several micrometers to tens of micrometers) that are required of reinforcements of a metal matrix composite, so that low-cost metallic fibers to serve for practical use cannot be obtained.

With the recent advance of performance that is required of various apparatuses, in particular, there is a growing tendency for higher fatigue strength or higher wear resistance to be required. Metallic fibers that can meet this high-level requirement are very hard and fragile, though not harder or more fragile than ceramics, so that they cannot be manufactured by the conventional wire drawing.

Usually, the casting method is used to compound a matrix and reinforcements. In the casting method, a preform (preformed piece previously molded to have a given shape and volume content) of fibers that serve as reinforcements is set in a mold. Thereafter, a molten matrix metal is poured into the mold. The preform is compulsorily impregnated with the matrix metal under a given pressure. A metal matrix composite is obtained by hardening the matrix metal.

In the case where carbon fibers or ceramic fibers are used for the reinforcements, they involve the following problems.

Carbon fibers and ceramic fibers have poor wettability with a light metal alloy that forms a base metal (matrix). Therefore, the light metal alloy of the matrix, e.g., Al alloy, fails to get well into spaces between the fibers, so that a large number of cavities (voids) are created inevitably. These defects lower the initial strength of the metal matrix composite and worsen the durability against corrosion or the like.

In order to improve the wettability with the matrix metal, therefore, the surface quality of the reinforcements that are formed of carbon fibers or ceramic fibers may be improved by plating or the like. However, the improvement of the surface quality requires many processes and much time, thus resulting in an increase in cost. Metallic fibers have a great advantage over carbon fibers and ceramic fibers with respect to the wettability with the matrix metal. As mentioned before, however, metallic fibers that are suited for reinforcements are expensive. It is hard for fibers of relatively low-priced stainless steel (SUS) to fulfill the high-level requirement for the high-temperature fatigue strength, wear resistance, etc.

Moreover, a composite that uses carbon fibers or ceramic fibers as its reinforcements must be preformed in order to prevent deformation of the reinforcements during casting operation. Preforming the carbon fibers or ceramic fibers requires a binder for use as an adhesive agent, and this binder causes the performance of the metal matrix composite to worsen.

A mold pressing method, extrusion molding method, and centrifugal molding method are known methods for manufacturing a preform with use of a binder. Any of these method requires many processes including a process for loosening fibers, process for applying the binder, temporary molding process, drying process, sintering process, etc.

There is also a problem that the composite using carbon fibers or ceramic fibers cannot be machined with ease. Primarily, carbon fibers and ceramic fibers are unworkable materials, so that it is natural that the metal matrix composite that uses them as its reinforcements cannot be worked with ease. Accordingly, there is a problem that the composite using carbon fibers or ceramic fibers entails prolonged working time or requires an expensive cutting tool. It is to be desired also in consideration of these circumstances that metallic fibers should be used for the reinforcements.

A metal matrix composite in which metallic fibers or ceramic fibers for use as reinforcements are mixed in a matrix metal of Al alloy has been developed as means for reducing the weight of and enhancing the strength of an engine piston. The casting method is adopted as a method for manufacturing the metal matrix composite of this type. Normally, heat treatment is carried out to enhance the mechanical strength of the composite after casting operation. There are close relations between conditions for the heat treatment and the chemical ingredients of the matrix (Al alloy). The Japanese Industrial Standards (JIS.H5202) provide the heat treatment conditions for the Al alloy of this type.

The aforesaid heat treatment includes a solution-treatment process for solidly solving additive elements in the alloy at high temperature and an age hardening process for extracting again the additive elements that are conducive to the improvement of the mechanical strength of the alloy after the solution-treatment process. According to a study made by the inventors hereof, however, it was recognized that the properties (e.g., fatigue strength) of the metal matrix composite worsen if the aforesaid heat treatment provided by JIS.H5202 is executed for the metal matrix composite in which the reinforcements of metallic fibers are mixed.

The aforesaid AC8A material that is a typical Al alloy for casting, for example, is loaded with Si, Ni, Mg, Cu. etc. as additive elements in order to restrain the coefficient of thermal expansion and improve the mechanical strength. According to JIS, heat treatment conditions for the AC8A material include 510° C. and 4 hours for the solution-treatment process and 170° C. and is 10 hours for the age hardening process. Hereinafter, this heat treatment will be referred to as T6 treatment. The following problems were aroused when the T6 process was applied to a metal matrix composite.

Let it be supposed, for example, that reinforcements, formed of FeCr metallic fibers of stainless steel or the like, are compounded with an Al alloy (matrix) and subjected to the T6 treatment. In this case, reactions occur on the interfaces between the matrix and the reinforcements, and intermetallic compounds such as FeAl, $FeAl_3$, etc. are formed. Although these intermetallic compounds are very hard, they are fragile, so that the fatigue strength of the composite is adversely affected.

On the other hand, the heat treatment is supposed to be executed after ceramic fibers of $B_2Al_2O_6$ or the like, for use as reinforcements, are compounded. In this case, reactions also occur on the interfaces between the matrix and the reinforcements, and an oxide compound such as $MgAl_2O_4$ is formed. Since this oxide compound, like the intermetallic compounds, is very fragile, so that the fatigue strength or the like of the composite is adversely affected.

The amount of formation of the intermetallic compounds of the composite that uses the metallic fibers is much greater than the amount of formation of the oxide compound obtained when the ceramic fibers are used, and the level of the bad influence is higher.

A method for coating the surfaces of the fibers used in the reinforcements with a film that cannot easily react with the matrix, e.g., an $Al_2O_3$ film that is chemically stable, can be adopted as means for solving the above problems. However, this method is not preferable because of its high cost.

Accordingly, the object of the present invention is to provide a metal matrix composite, using metallic fibers for reinforcements and enjoying excellent strength, wear resistance, etc. without subjecting the reinforcements to any surface treatment such as coating, and a piston using the same.

BRIEF SUMMARY OF THE INVENTION

In order to achieve the above object, according to the present invention, there is provided a metal matrix composite having a metallic matrix and reinforcements mixed in the matrix, in which the reinforcements are formed of an alloy consisting mainly of Fe and Cr and containing Al and/or Si. The Cr content and the Al and/or Si content of metallic fibers that meet the object of the present invention range from 5 to 30% and from 3 to 10%, respectively.

Fe (iron), Ni (nickel), or Ti (titanium) may possibly be used as a metal to serve as the base of an alloy that constitutes the reinforcements (metallic fibers) of the present invention. Since Ni and Ti are too expensive to be adopted, however, Fe is used as the base metal. The oxidation resistance is improved by adding Cr. Normally, compounding a matrix metal and reinforcements requires preheating of preformings of the reinforcements.

The preheating is carried out in order to improve the wettability with the matrix metal first. The higher the temperature, in general, the better the wettability of reinforcements with a matrix is. In the process of cooling the matrix metal and the reinforcements after they are joined together, defects are liable to be caused if the difference in shrinkage between them is great, so that preheating is required. In the case of ceramic fibers, preheating to 600° C. to 800° C. is necessary in order to prevent occurrence of defects, even if the surface quality is improved by plating or the like.

On the other hand, metallic fibers is higher in wettability with the matrix metal than ceramic fibers, and their coefficient of thermal expansion is relatively close to that of the matrix metal. Accordingly, the metallic fibers have an advantage over the ceramic fibers in being satisfactorily preheated to a lower temperature (500° C. or below) than the ceramic fibers is. However, the metallic fibers have a problem of oxidation by preheating.

For example, an oxide film may possibly be formed on the surface of each metallic fiber during the preheating process.

If this oxide film is an oxide of Fe ($Fe_2O_3$), the wettability with the matrix metal is poor. Thus, the matrix metal cannot easily get into spaces between the fibers. Since the oxide film easily separates from each metallic fiber, moreover, defects are caused. In order to improve the oxidation resistance during the preheating process, according to the present invention, therefore, oxidation of the base metal (Fe) of the reinforcements is prevented by adding Cr.

The inventors hereof manufactured a plurality of types of test pieces with varied quantities of Cr added to the base metal (Fe), by arc solution-treatment, and conducted an oxidation test. According to the method of the oxidation test, the manufactured test pieces were left to stand for two hours in the atmosphere in electric ovens at different ambient temperatures. After these test pieces were taken out of the electric ovens, the colors of the respective surfaces of the test pieces were visually observed and further observed by means of an electron microscope (SEM), and the surface conditions were checked to see if they were changed by heating. By an analysis by means of an EDX (energy dispersed X-ray spectrometer), moreover, the presence of oxides in the test pieces was examined.

The results of the above examinations are shown in TABLE 1. Based on these examinations, it was confirmed that an oxidation preventing effect is produced with the Cr content at 5% or more. A very small quantity of oxygen was detected in the EDX analysis with the Cr content at 5%. However, this is negligible because it is a dense, very thin Cr oxide that has good wettability with the matrix metal and good adhesion to the metallic fibers. Preferably, therefore, the Cr content should be 5% or more. In order to improve the safety (reliability) further, however, the Cr content should preferably be 10% or more.

TABLE 1

| Cr content (%) | Surface after heat treatment | Observation by SEM | EDX analysis |
| --- | --- | --- | --- |
| 1 | Turned dark blue | Degenerated | Oxygen detected |
| 3 | Turned light blue | Degenerated | Oxygen detected |
| 5 | No change by heat treatment | No change by heat treatment | Oxygen (very small quantity) detected |
| 10 | No change by heat treatment | No change by heat treatment | No oxygen detected |
| 20 | No change by heat treatment | No change by heat treatment | No oxygen detected |
| 30 | No change by heat treatment | No change by heat treatment | No oxygen detected |

Performance that meets high-level requirements for the high-temperature fatigue strength and wear resistance cannot be obtained by only adjusting the Cr content to the aforesaid value (5% or more). According to the present invention, therefore, Al and/or Si that is low-priced is added as an element for improving the strength, hardness, and thermal resistance. Test pieces for which the quantity of Al or Si added to FeCr for use as a base metal is changed variously were manufactured by arc solution-treatment, and the oxidation resistance was evaluated by carrying out the same oxidation test as aforesaid. At the same time, a tensile test on the test pieces was conducted at the ambient temperature of 300° C. The ambient temperature of 300° C. is equivalent to the working atmosphere temperature of internal-combustion engine parts (e.g., pistons, etc.). Further, the degree of difficulty of fiberization based on drawing of the alloy material and the degree of difficulty of fiberization by the melt extraction method were examined.

TABLE 2 shows the results of the above tests for the case where Si was added. The same tendency was observed for the case where Al was added. In TABLE 2, ○, Δ, and x represent good, passable, and failure, respectively.

TABLE 2

| Cr content [%] | Si content [%] | Oxidation resistance | Tensile strength (at 300° C.) [MPa] | Fiberization (drawing) | Fiberization (melt extraction method) |
| --- | --- | --- | --- | --- | --- |
| 5 | 1 | ○ | 702 | ○ | ○ |
|   | 3 | ○ | 802 | ○ | ○ |
|   | 5 | ○ | 917 | Δ | ○ |
|   | 10 | ○ | 991 | X | ○ |
|   | 15 | ○ | 1010 | X | X |
| 10 | 1 | ○ | 710 | ○ | ○ |
|   | 3 | ○ | 815 | ○ | ○ |
|   | 5 | ○ | 932 | Δ | ○ |
|   | 10 | ○ | 1003 | X | ○ |
|   | 15 | ○ | 1033 | X | X |
| 20 | 1 | ○ | 715 | ○ | ○ |
|   | 3 | ○ | 830 | Δ | ○ |
|   | 5 | ○ | 951 | X | ○ |
|   | 10 | ○ | 1015 | X | Δ |
|   | 15 | ○ | 1064 | X | X |
| 30 | 1 | ○ | 736 | Δ | ○ |
|   | 3 | ○ | 842 | X | ○ |
|   | 5 | ○ | 972 | X | Δ |
|   | 10 | ○ | 1022 | X | Δ |
|   | 15 | ○ | 1082 | X | X |
| 40 | 1 | ○ | 745 | X | X |
|   | 3 | ○ | 849 | X | X |
|   | 5 | ○ | 988 | X | X |
|   | 10 | ○ | 1030 | X | X |
|   | 15 | ○ | 1092 | X | X |

As seen from TABLE 2, metallic fibers that can display higher strength (800 MPa or more) than stainless steel and can be fiberized preferably have Cr contents of 5 to 30% and Al and/or Si contents of 3 to 10%.

TABLE 3 shows the diameters and cuttability of metallic fibers that can be manufactured by the melt extraction method. Preferably, as shown in TABLE 3, the lower limit value of the fiber diameter should not be lower than $\phi 20\,\mu m$, which is the lower limit for the fiberization by the melt extraction method. As for the upper limit value of the fiber diameter, it is expected to be not higher than $\phi 100\,\mu m$ in consideration of the post-workability (cuttability) after compounding. Symbol $\phi 1$ represents the diameter of each fiber. The cross section of each reinforcement (metallic fiber) may be perfectly circular. Preferably, however, the cross section should be irregular in the circumferential direction, like those of the metallic fibers that are manufactured by the melt extraction method, since the bite (anchor effect) on the matrix is then improved. By the melt extraction method, moreover, even metallic fibers that are formed of an unworkable material can be manufactured at relatively low costs.

TABLE 3

| Metallic fiber diameter [μm] | Application of melt extraction method | Machinability |
| --- | --- | --- |
| φ 10 | Inapplicable | — |
| φ 20 | Applicable | Non-defective |

TABLE 3-continued

| Metallic fiber diameter [μm] | Application of melt extraction method | Machinability |
|---|---|---|
| φ 30 | Applicable | Non-defective |
| φ 40 | Applicable | Non-defective |
| φ 50 | Applicable | Non-defective |
| φ 60 | Applicable | Non-defective |
| φ 70 | Applicable | Non-defective |
| φ 80 | Applicable | Non-defective |
| φ 90 | Applicable | Non-defective |
| φ 100 | Applicable | Non-defective |
| φ 110 | Applicable | Cracked |
| φ 120 | Applicable | Cracked |
| φ 130 | Applicable | Cracked and chipped |

According to the present invention, there may be obtained a metal matrix composite that enjoys outstanding fatigue strength and wear resistance at high temperature, in particular. Since the metal matrix composite of the present invention is dissolved at 470° C. to 500° C., reactants such as intermetallic compounds can be restrained from being formed on the interfaces between the matrix and the reinforcements, and the fatigue strength can be improved further.

Since the metal matrix composite of the present invention is substantially formed of metals only, it can be recycled with ease. Since the respective mechanical properties of the matrix and the reinforcements are relatively similar, moreover, cutting that is carried out after casting is easy, and the working time and working cost can be reduced considerably. Since the reinforcements (metallic fibers) can be preformed without using any binder, furthermore, an application process, temporary molding process, drying process, etc. for a binder can be omitted. A piston that uses the metal matrix composite of the present invention for a lip portion of its combustion chamber has excellent machinability and enhanced high-temperature strength, and can be recycled.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

One embodiment of the present invention will now be described with reference to FIGS. 1 to 8.

Figure 1:
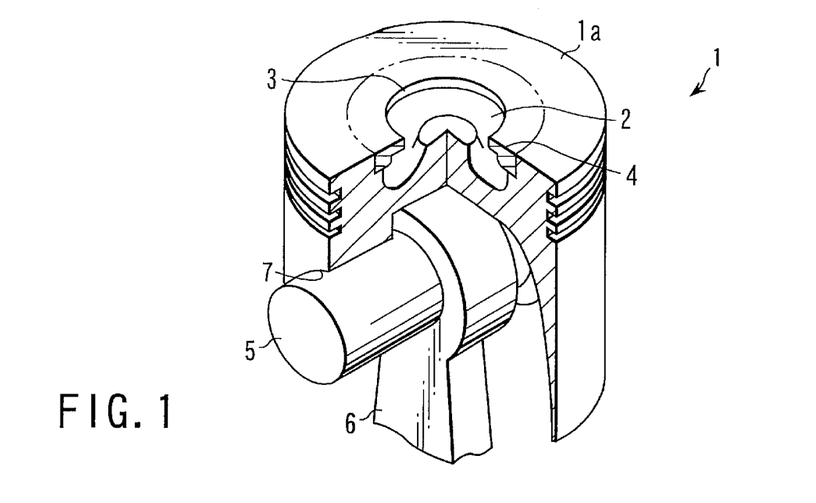
FIG. 1 is a perspective view, partially in section, showing a piston using a metal matrix composite according to one embodiment of the present invention.

FIG. 1 shows an example of a piston 1 for an internal-combustion engine. A combustion chamber 2, a recess for producing air currents such as swirls, is formed in a top face 1a of the piston 1 by machining. That portion of the piston 1 which is relatively thin and is exposed to high temperature, that is, a portion including a lip portion 3 of the combustion chamber 2, is composed of a metal matrix composite 4. The piston 1 is connected to a connecting rod 6 (only a part of which is shown) by means of a piston pin 5. The piston pin 5 is inserted in a piston pin socket hole 7.

Figure 2:
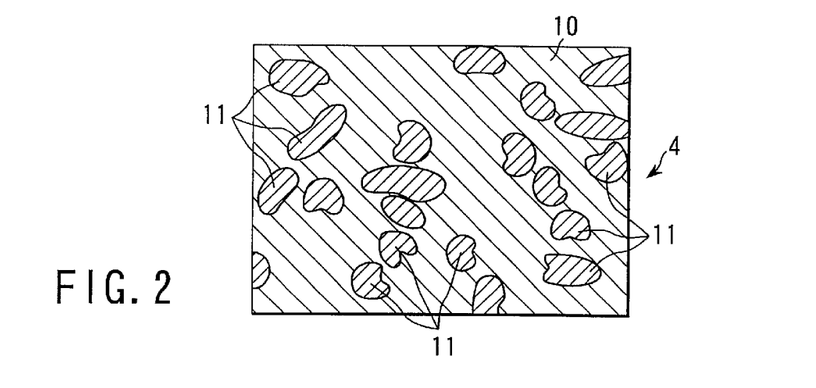
FIG. 2 is an enlarged sectional view showing a part of the metal matrix composite shown in FIG. 1.

The metal matrix composite 4, a part of which is shown in the enlarged view of FIG. 2, includes a matrix 10 formed of an aluminum alloy and reinforcements 11 formed of metallic fibers with diameters of ø20 μm to 100 μm mixed in the matrix 10. The material of the reinforcements 11 is an alloy that consists mainly of Fe and Cr and contains Al and/or Si. The Cr content of the reinforcements 11 ranges from 5 to 30% for the aforesaid reason, and the Al and/or Si content ranges from 3 to 10%.

Figure 3A:
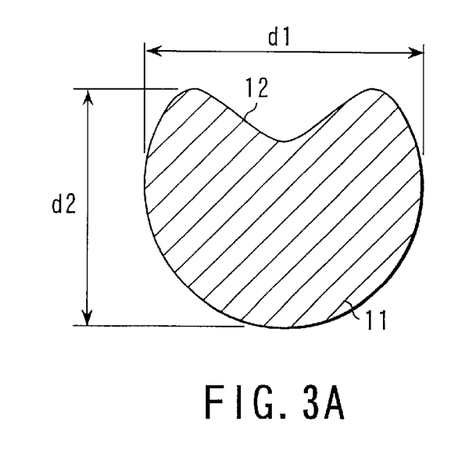
FIG. 3A is a sectional view of a reinforcement used in the metal matrix composite shown in FIG. 1.
Figure 3B:
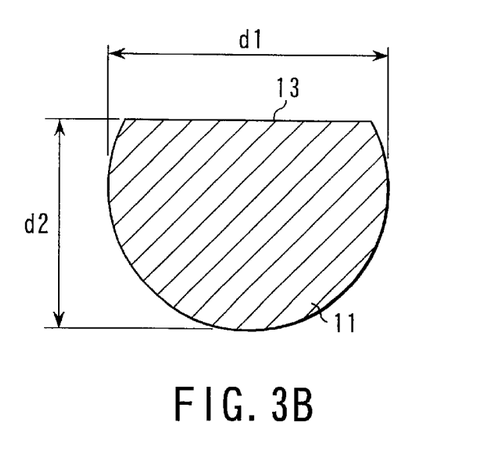
FIG. 3B is a sectional view showing another example of the cross-sectional shape of the reinforcement.

If the reinforcements (metallic fibers) 11 are manufactured by the melt extraction method described below, the cross section of each reinforcement 11 is not perfectly circular and has irregularity in the circumferential direction. As shown in FIGS. 3A and 3B, for example, a V-shaped depression 12 or a flat portion 13 is formed on the peripheral surface of each reinforcement 11. The diameter is given by d=(d1+d2)/2. These reinforcements 11 are directed at random as they are mixed in the matrix 10. If the composite 4 is cut in the manner shown in FIG. 2, the respective cross sections of the reinforcements 11 on their cut surfaces have various shapes. If the irregular reinforcements 11 are used in this manner, the bond strength of the matrix 10 and the reinforcements 11 is enhanced owing to an anchor effect of the reinforcements 11 in the matrix 10.

Figure 4:
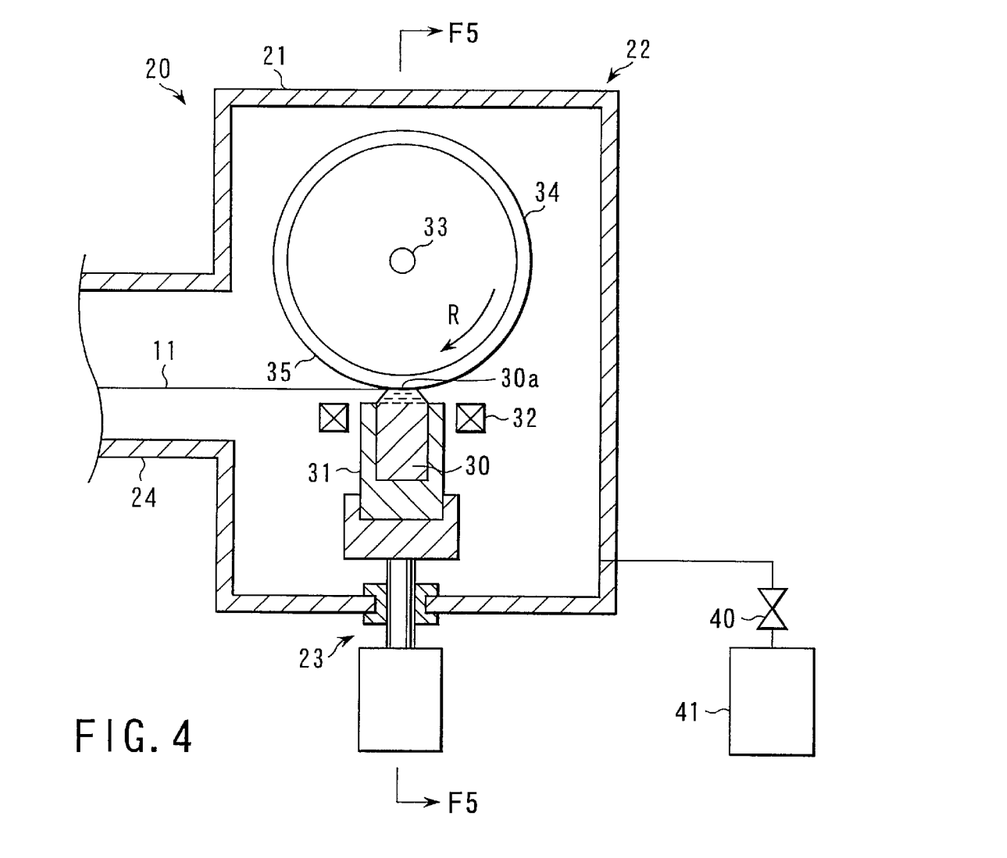
FIG. 4 is a vertical sectional view of a metallic fiber manufacturing apparatus for carrying out the melt extraction method.
Figure 5:
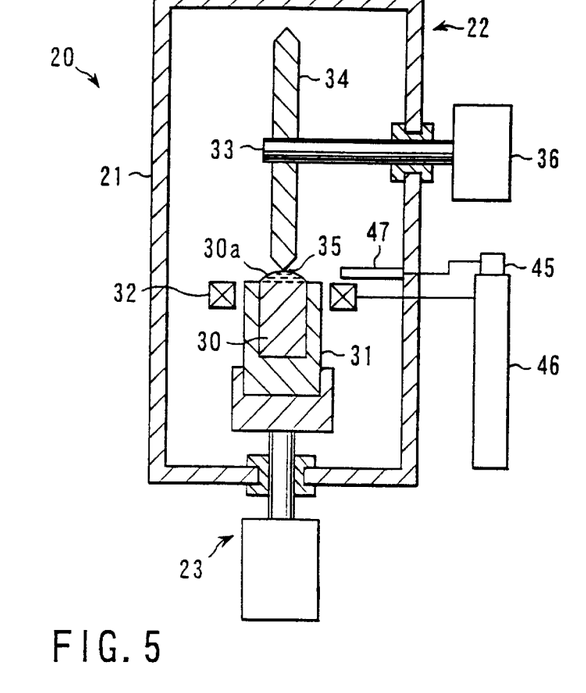
FIG. 5 is a sectional view of the metallic fiber manufacturing apparatus taken along line F5—F5 of FIG. 4.

The piston 1 is manufactured undergoing a metallic fiber manufacturing process for obtaining the reinforcements 11, preforming process, casting process, and machining process. In the metallic fiber manufacturing process, the reinforcements 11 are manufactured by the melt extraction method using a metallic fiber manufacturing apparatus 20 that is schematically shown in FIGS. 4 and 5. The manufacturing apparatus 20 comprises an apparatus body portion 22, which includes a chamber 21, and a material supply mechanism 23, a metallic fiber recovery portion 24, etc. that are attached to the apparatus body portion 22. Arranged in the chamber 21 are a holder 31 for holding a rod-shaped material metal 30 as a material of the reinforcements 11, a high-frequency induction coil 32 that serves to melt the upper end portion of the material metal 30, thereby forming a molten metal 30a, and a disk 34 that is rotated in a fixed direction (direction indicated by arrow R in FIG. 4) around a shaft 33.

The disk 34 is formed of a metal with high thermal conductivity, such as copper or copper alloy, or a high-melting point material, such as molybdenum or tungsten, and has a peripheral edge 35 that is brought into contact with the molten metal 30a. If the disk 34 is viewed sideways, as shown in FIG. 5, the peripheral edge 35 of the disk 34 forms a V-shaped sharp edge that covers the whole circumference of the disk 34. The disk 34 is rotated at high speed by means of a rotating mechanism 36.

An unoxidized atmosphere generator 41 is attached to the chamber 21 so that a vacuum atmosphere (decompressed atmosphere, exactly) or an unoxidized atmosphere, such as an inert gas, can be kept in the chamber 21. The apparatus 41 is provided with an on-off valve 40, a vacuum pump or inert gas source, etc. A high-frequency generator 46 is connected to the high-frequency induction coil 32 through a current control device 45 (shown in FIG. 5). Further provided is a radiation thermometer 47 for detecting the temperature of the molten metal 30a in a noncontact manner. The radiation thermometer 47 is connected electrically to the high-frequency generator 46 through the current control device 45.

In the metallic fiber manufacturing apparatus 20 constructed in this manner, the disk 34 is rotated at a given peripheral speed by means of the rotating mechanism 36. As the material metal 30 held by means of the holder 31 is gradually pushed up by means of the material supply mechanism 23, moreover, the upper end portion of the material metal 30 moves to the level of the high-frequency induction coil 32.

Then, the upper end portion of the material metal 30 is heated by means of the high-frequency induction coil 32, whereupon the molten metal 30a is formed on the upper end of the material metal 30. The temperature of the molten metal 30a is continually detected by means of the radiation thermometer 47. As a detection signal from the thermometer 47 is fed back to the high-frequency generator 46, the output of the high-frequency generator 46 is adjusted, and the temperature of the molten metal 30a is kept constant.

The molten metal 30a, which is brought into contact with the sharp peripheral edge 35 of the disk 34, is rapidly cooled to be solidified as the disk 34 rotates, and at the same time, continuously flies as metallic fibers (reinforcements 11) with diameters of 20 μm to 100 μm in the tangential direction. The metallic fibers (reinforcements 11) are introduced into the metallic fiber recovery portion 24. Since the material metal 30 is gradually pushed up by means of the material supply mechanism 23 as the quantity of the molten metal 30a decreases, the state of contact between the peripheral edge 35 of the disk 34 and the molten metal 30a can be kept constant.

The cross section of each reinforcement 11 manufactured by the melt extraction method has irregularity in the circumferential direction, as shown in FIG. 3A or 3B, for example, depending on the state of the disk 34 or the molten metal 30a. In some cases, moreover, the cross-sectional shape of each reinforcement 11 may vary in the longitudinal direction.

Figure 6A:
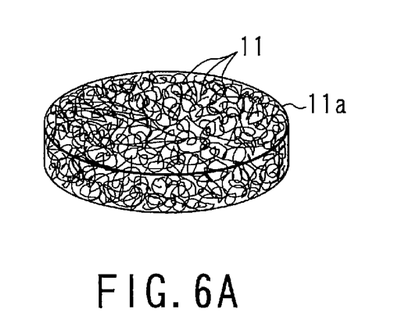
FIG. 6A is a perspective view of a preform used in the metal matrix composite shown in FIG. 1.
Figure 6B:
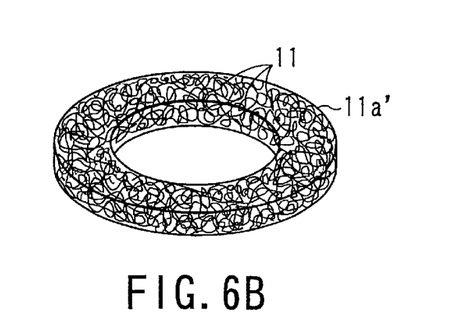
FIG. 6B is a perspective view showing another example of the preform.

In the preforming process, a disk-shaped preform 11a, such as the one shown in FIG. 6A, or a ring-shaped preform 11a', such as the one shown in FIG. 6B, is obtained by preforming the reinforcements 11 into a desired shape by using suitable forming means such as sintering. These preforms 11a and 11a' are compressed into a desired cubic shape so that the reinforcements 11 are intertwined with one another, and are heated so that nodes of the fibers are sintered. Thus, the preforms 11a and 11a' in the form of porous blocks with stable shapes are obtained. For example, a preform with a desired shape can be obtained by forming fleecy webs (fibrous aggregates like nonwoven fabric) from the fibrillated reinforcements 11, superposing these webs in tens of layers, and compressively sintering them.

Figures 7A, 7C, 7D:
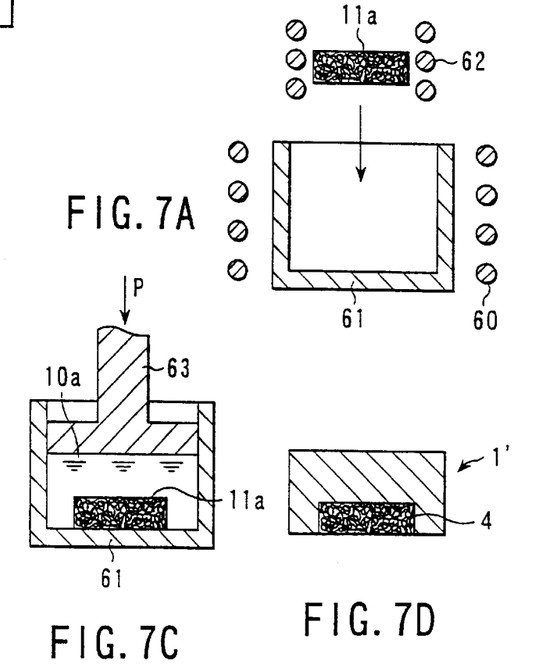
FIGS. 7A to 7D are sectional views showing a mold and a preform for manufacturing a piston including the metal matrix composite shown in FIG. 1 in manufacturing processes, individually.
Figure 7B:
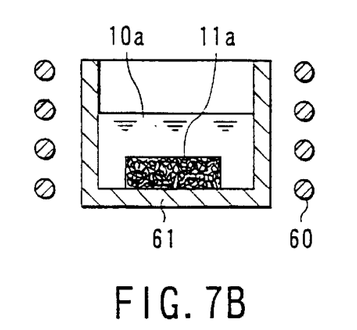

The casting process is carried out using a casting mold 61 with a heater 60 for preheating and a heater 62 for heating the preform 11a, as shown in FIG. 7A. The casting mold 61 is preheated in advance to a given temperature by means of the heater 60. As shown in FIG. 7B, the preform 11a is loaded into the casting mold 61, and a molten alloy 10a for a matrix is poured into the casting mold 61, whereby the preform 11a is impregnated with the molten alloy 10a.

Thereafter, the molten alloy 10a is pressurized under a pressure P of, e.g., 100 MPa by means of a pressure member 63, as shown in FIG. 7C. As the molten alloy 10a penetrates into spaces between the reinforcements 11 of the preform 11a and hardens, a semi-finished piston 1' is obtained partially having the metal matrix composite 4, as shown in FIG. 7D. The volume content (Vf) of the reinforcements 11 in the metal matrix composite 4 ranges from 10% to 50%, and preferably from 10% to 30%.

The combustion chamber 2 having the lip portion 3 with a desired shape is formed as the obtained semi-finished piston 1' is machined (mainly cut) in the machining process. Further, the top face 1a of the piston 1 and the outer peripheral surface of the piston 1 are finished, and the piston pin socket hole 7 is machined.

Metallic fibers with diameters of less than ø20 μm cannot be easily manufactured by the aforesaid the melt extraction method. If the diameter is not smaller than ø100 μm, moreover, the molten metal of the matrix cannot be loaded well into the gaps between the fibers (reinforcements), so that defects (voids) are liable to be caused between the matrix and the reinforcements. If the diameter exceeds ø100 μm, furthermore, the influence of the reinforcements, compared with that of the matrix, becomes too great when the composite is machined (or cut), so that it is hard to set working conditions.

Figure 8:
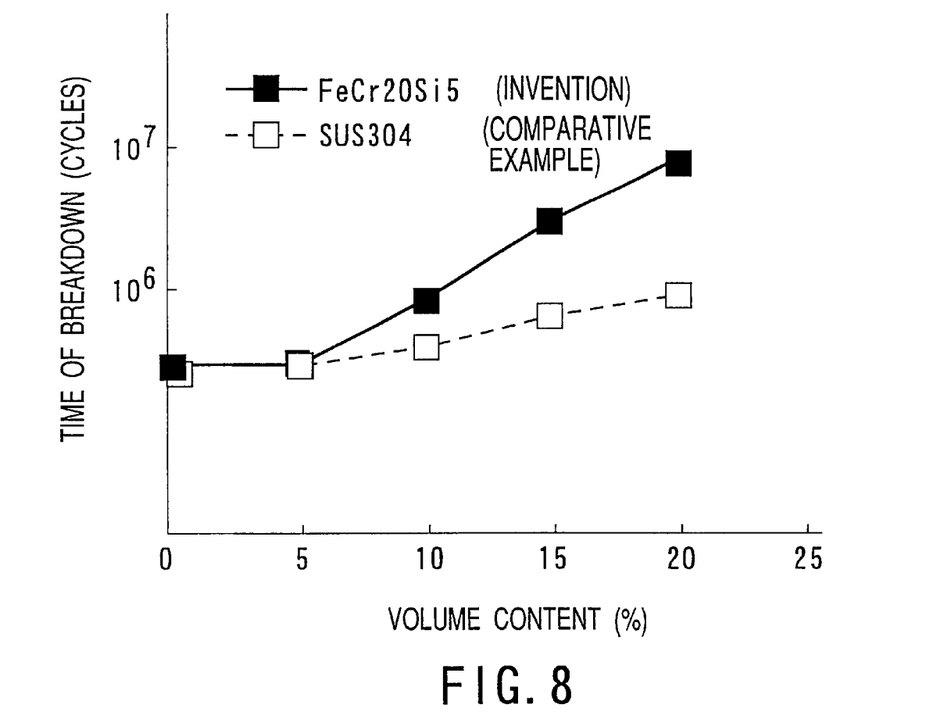
FIG. 8 is a diagram showing relations between the volume content of metallic fibers and the time of breakdown of the metal matrix composite.

FIG. 8 shows the result of examination of the relation between the volume content (Vf) of the reinforcements 11 of the metal matrix composite 4 and the time of breakdown. The volume content (Vf) is a value that is given by $Vf=(V_2/V_1)\times100$ (%), where $V_1$ and $V_2$ are the total volume of the metal matrix composite 4 and the volume of the reinforcements 11, respectively. Aluminum alloy AC8A (JIS.H5202) for casting was used as the material of the matrix 10 and subjected to heat treatment T6 (JIS.H5202) after casting operation. FeCrSi alloy (Cr: 20%, Si: 5%) was used for the reinforcements 11, which were manufactured by the aforementioned the melt extraction method. This metal matrix composite 4 was subjected to a rotary bending test (JIS.Z2274) at an ambient temperature of 300° C. and under repeated stress of 60 MPa. A metal matrix composite as a comparative example is a metallic fiber that is composed of AC8A as its matrix and stainless steel (SUS 304) as its reinforcements.

If the volume content of the reinforcements reaches 10% or more, as shown in FIG. 8, both the product of the present invention and the comparative example enjoy the development of an effect on their time of breakdown. While the time of breakdown of the comparative example is about $10^6$ cycles when the volume content is not lower than 20%, however, the time of breakdown of the metal matrix composite 4 of the present invention, which uses the reinforcements 11 of FeCr(Al, Si) alloy, is $10^7$ or more, displaying a considerable improvement. If the content of the reinforcements 11 exceeds 40%, cavities (voids) are created while the matrix 10 is being cast. Therefore, 40% is the upper limit of the content of the reinforcements 11.

Figure 9:
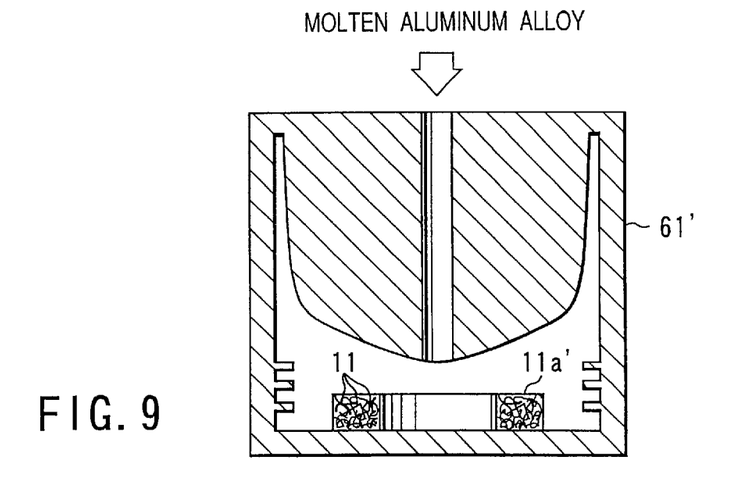
FIG. 9 is a sectional view of a casting mold for piston molding and a preform held therein.
Figure 10:
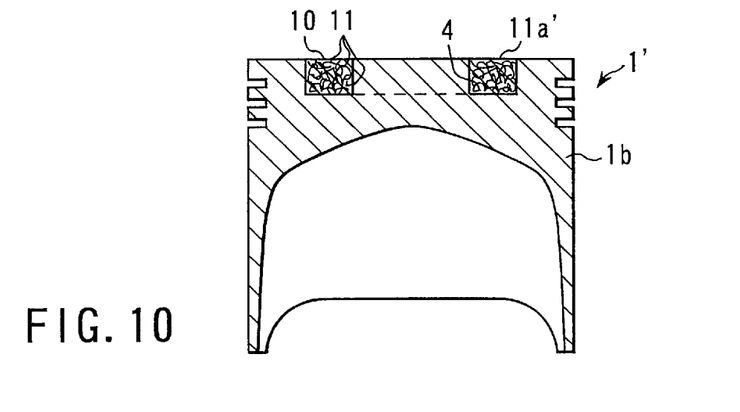
FIG. 10 is a sectional view of a semi-finished piston cast by means of the casting mold shown in FIG. 9.
Figure 11:
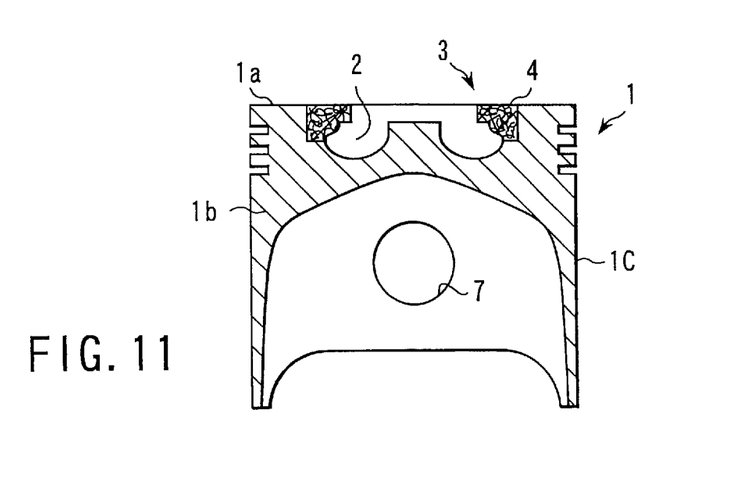
FIG. 11 is a sectional view of a piston obtained by machining the semi-finished piston shown in FIG. 10.

FIGS. 9 to 11 show processes for manufacturing the piston 1 using the ring-shaped preform 11a' shown in FIG. 6B. After the preform 11a' is loaded into a casting mold 61', in the casting process shown in FIG. 9, a molten Al alloy to form the matrix 10 is poured into the casting mold 61'. The molten Al alloy poured into the casting mold 61' hardens and forms a piston body portion 1b. At the same time, the molten Al alloy penetrates into spaces between the reinforcements 11 of the preform 11a' and hardens, whereupon the metal matrix composite 4 is formed. In this manner, the semi-finished piston 1' that includes the metal matrix composite 4, as shown in FIG. 10, is manufactured.

The semi-finished piston 1' is formed with the combustion chamber 2 that has the lip portion 3 with the desired shape as its workable portion including the metal matrix composite 4 is machined in the machining process, as shown in FIG. 11. Further, the top face la of the piston 1 and a piston periphery 1c are finished, and the piston pin socket hole 7 is machined.

In the process of developing the metal matrix composite 4, the inventors hereof conducted various tests for intermetallic compounds that are formed on the interfaces between the matrix 10 and the reinforcements 11. The matrix of the metal matrix composite used in the tests is AC8A, and the reinforcements are metallic fibers (diameter: about ø30 μm, volume content Vf: 20%) that are formed of FeCrSi alloy (Cr: 20%, Si: 5%) manufactured by the melt extraction method.

Figure 14:
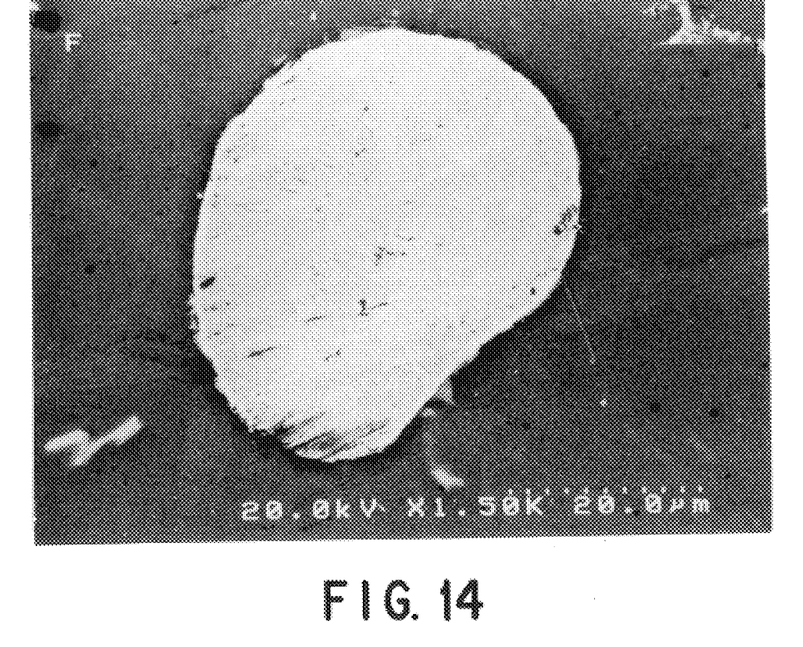
FIG. 14 is a 1,500-magnification photomicrograph of a cross section of the metal matrix composite before heat treatment.

First, in the case where the conventional heat treatment conditions (T6 treatment) were carried out, the composition of the composite was observed before heat treatment, after solution-treatment, and after age hardening. FIG. 14 is a 1,500-magnification photomicrograph of a cross section of the metal matrix composite before heat treatment. A substantially circular cross section appearing in the center of FIG. 14 indicates a reinforcement. Very minute intermetallic compounds are observed around this reinforcement. The presence of these minute intermetallic compounds implies that a reaction is already caused on the interface between the matrix and the reinforcement when the matrix and the reinforcement are compounded (in the casting process of the matrix). Since the quantity of the intermetallic compounds is very small, however, they never have any bad influences upon the properties of the composite.

Figure 15:
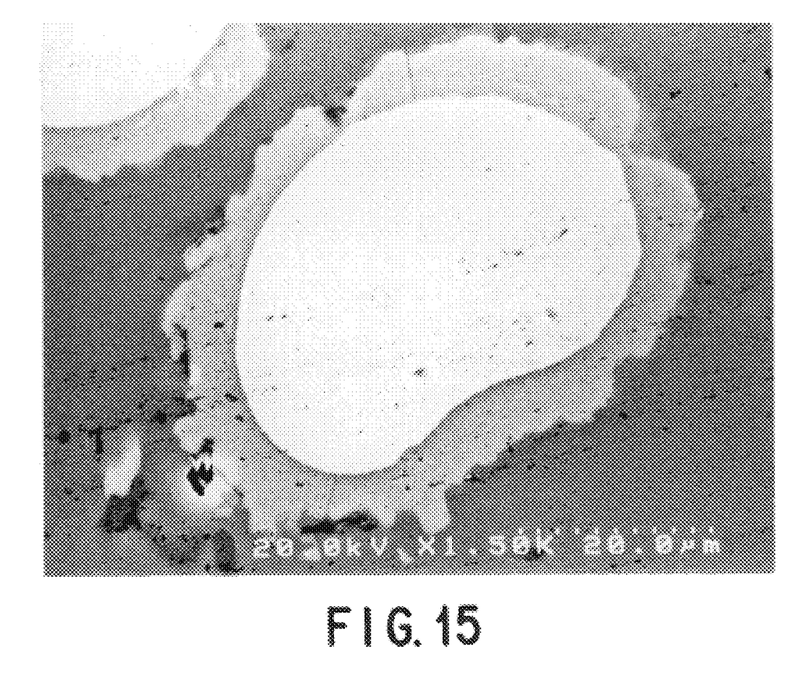
FIG. 15 is a 1,500-magnification photomicrograph of a cross section of the metal matrix composite having cavities attributable to solution-treatment at 510° C.

FIG. 15 is a photomicrograph (power: 1,500 magnifications) obtained after the composite was performed solution-treatment at 510° C. As shown in FIG. 15, the whole circumference of a reinforcement is covered with a large quantity of intermetallic compounds. These intermetallic compounds are supposed to be grown versions of the minute intermetallic compounds shown in FIG. 14 as nuclei. Further, creation of cavities (voids) in the matrix was recognized. The cavities are supposed to have been created because the growth of the intermetallic compounds, which are denser than the matrix, caused a substantial change of density in the matrix. Thus, the abundant intermetallic compounds that cover the whole circumference of the reinforcement are so fragile that they are expected to exert a bad influence upon the fatigue strength of the composite. Further, the creation of the cavities may possibly adversely affect the composite. No growth of the intermetallic compounds was observed in the age hardening (at 170° C. for 10 hours).

Figure 16:
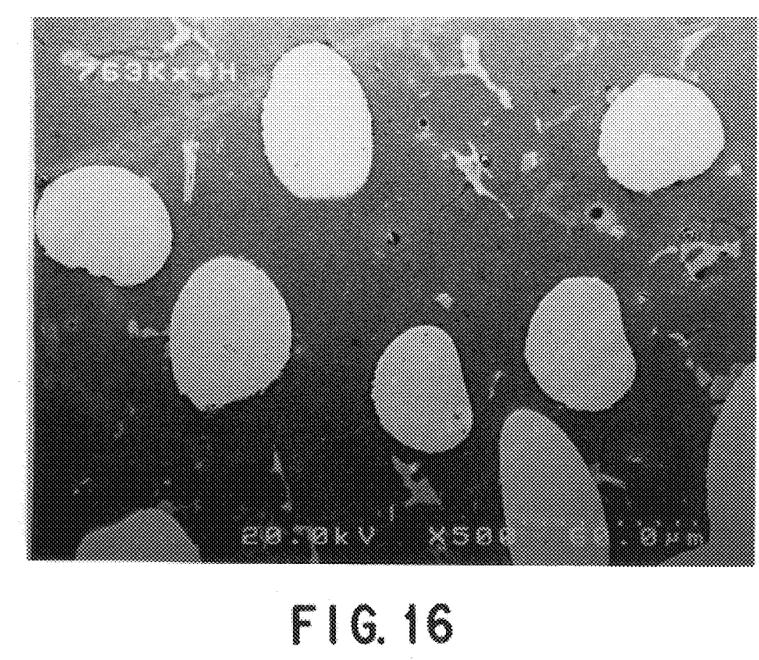
FIG. 16 is a 500-magnification photomicrograph of a cross section of the metal matrix composite was performed solution-treatment at 490° C.

The inventors hereof examined temperatures at which the intermetallic compounds grow in the metal matrix composite. FIG. 16 is a photomicrograph (500 magnifications) obtained when the composite was performed solution-treatment at 490° C. When the solution-treatment temperature was at 490° C., as shown in FIG. 16, neither intermetallic compounds nor cavities were observed at all around the reinforcement.

Figure 17:
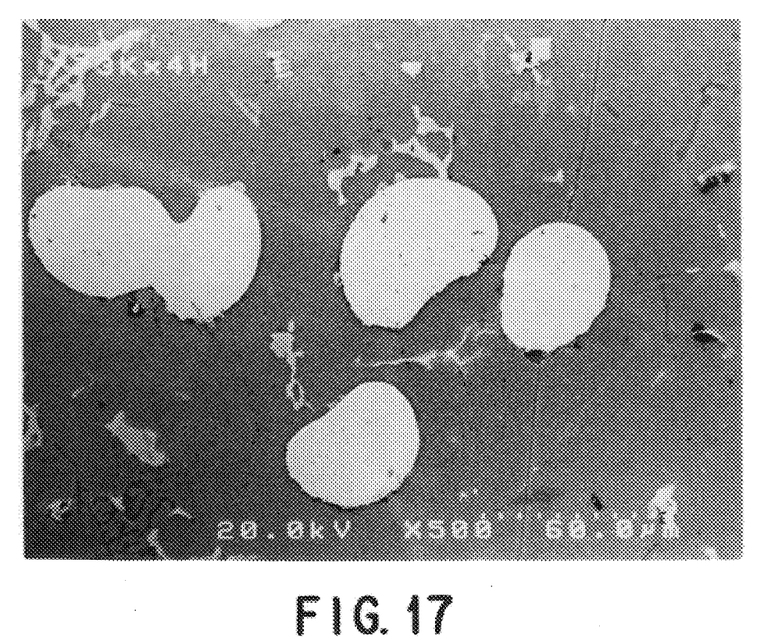
FIG. 17 is a 500-magnification photomicrograph of a cross section of the metal matrix composite was performed solution-treatment at 500° C.
Figure 18:
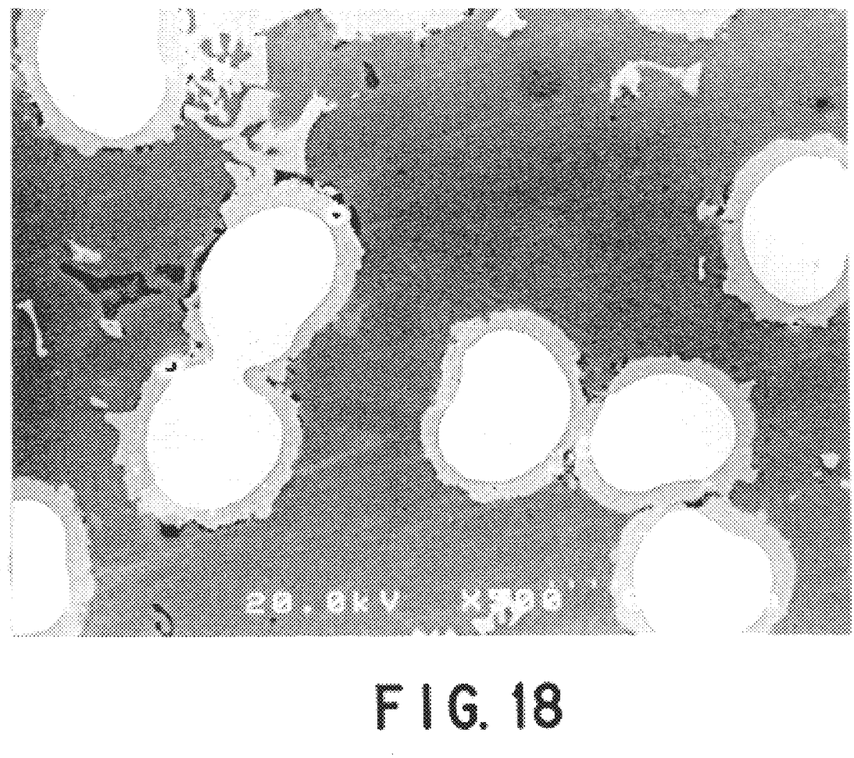
FIG. 18 is a 500-magnification photomicrograph of a cross section of the metal matrix composite with intermetallic compounds formed by solution-treatment at 510° C.

FIG. 17 is a photomicrograph (500 magnifications) obtained when the composite was performed solution-treatment at 500° C. When the solution-treatment temperature was at 500° C. or thereabout, as shown in FIG. 17, a slight growth of the intermetallic compounds was recognized. However, these intermetallic compounds are not all, and creation of cavities was not recognized. FIG. 18 is a photomicrograph (500 magnifications) obtained when the composite was performed solution-treatment at 510° C. When the solution-treatment temperature was at 510° C., as shown in FIG. 18, growth of the intermetallic compounds covering the whole circumference of the reinforcement was recognized.

Figure 12:
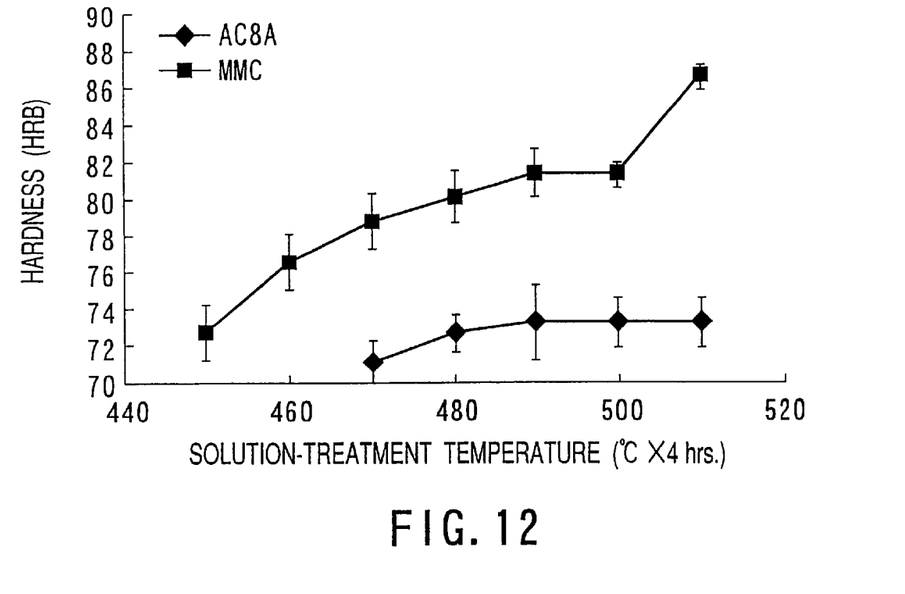
FIG. 12 is a diagram showing relations between solution-treatment temperature for an AC8A material and the metal matrix composite and Rockwell B hardness (HRB)

The inventors hereof examined the way the hardness of the composite changes depending on the solution-treatment temperature. The result is shown in FIG. 12. The axis of ordinate of FIG. 12 represents Rockwell B hardness (test load: 100 kg). When the solution-treatment temperature was at 470° C. or above, as shown in FIG. 12, higher hardness than that of an AC8A material that contains no reinforcements was obtained. The hardness drastically increased at 510° C. or thereabout, since a plenty of intermetallic compounds were produced. The intermetallic compounds constitute a factor that exerts a bad influence upon the fatigue strength of the metal matrix composite. The metal matrix composite can obtain its maximum hardness at temperatures of about 490° C. to 500° C. except for the temperature (510° C.) at which the intermetallic compounds grow.

When the solution-treatment temperature is at the conventional level of 510° C. or above, as described above, the intermetallic compounds grow and inevitably exert a bad influence upon the composite. If the solution-treatment temperature is lower than 470° C., however, the reinforcements cannot provide the effect of improvement in strength. Thus, it is concluded that the solution-treatment temperature preferably ranges from 470° C. to 500° C., and especially, from 490° C. to 500° C.

Figure 13:
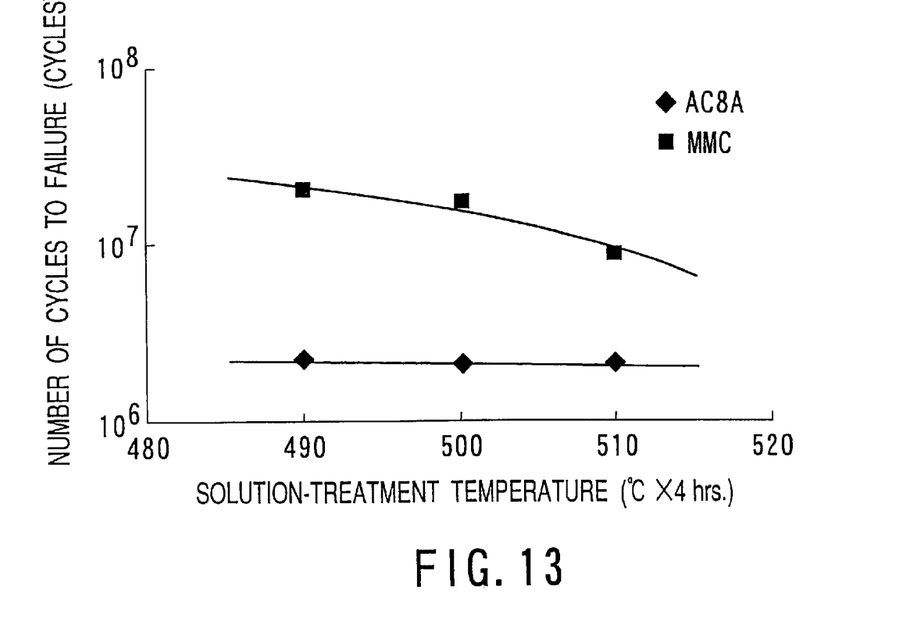
FIG. 13 is a diagram showing relations between solution-treatment temperature for the AC8A material and the metal matrix composite and number of cycles to failure.

In order to examine the durability of the composite described above, the rotary bending fatigue test (JIS.Z2274) was conducted at the ambient temperature of 300° C. and under repeated stress of 60 MPa. The matrix of the composite used in the test is AC8A, and the reinforcements are metallic fibers (diameter: about $\phi 30\,\mu m$, volume content Vf: 20%) that are formed of FeCrSi alloy (Cr: 20%, Si: 5%). As shown in FIG. 13, the composite was performed solution-treatment at 490° C. enjoyed about 10 times as high durability as that of the AC8A material that contains no reinforcements. For these reasons, it was confirmed that by keeping the solution-treatment temperature of the metal matrix composite within the aforesaid appropriate range (470° C. to 500° C.), the formation of intermetallic compounds was able to be restrained without subjecting the reinforcements to any surface treatment such as coating, and the fatigue strength of the metal matrix composite was improved.

As is evident from the above description, the metal matrix composite of the present invention can be suitably used in components that require reduction in weight, high-temperature strength, etc., including engine parts such as pistons of internal-combustion engines. It is to be understood, in carrying out this invention, that the elements that constitute the present invention, including the matrix and the reinforcements, can be suitably modified according to the applications of the metal matrix composite.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A metal matrix composite comprising a matrix made of an aluminum alloy and reinforcements mixed in said matrix, wherein said reinforcements are metallic fibers made of an Fe—Cr—Si alloy consisting mainly of Fe and containing 5 to 30% of Cr and 3 to 10% of Si.

2. A metal matrix composite according to claim 1, wherein said Fe—Cr—Si alloy contains 5 to 10% of Si.

3. A metal matrix composite according to claim 1, wherein said metal matrix composite is subjected to a solution-treatment at temperatures such that formation of reactants on interfaces between said matrix and the reinforcements is restrained.

4. A metal matrix composite according to claim 3, wherein said reactants are intermetallic compounds, and said solution-treatment is carried out within a range from 470° C. to 500° C.

5. A metal matrix composite according to claim 1, wherein said reinforcements are preformed into a given shape by sintering.

6. A metal matrix composite according to claim 1, wherein said metallic fibers have diameters of $\phi 20\,\mu m$ to $\phi 100\,\mu m$ and irregular peripheral surfaces, and are formed by a melt extraction method.

7. A metal matrix composite according to claim 1, wherein a volume content of said reinforcements ranges from 10% to 40%.

8. A metal matrix composite comprising a matrix made of an aluminum alloy and reinforcements mixed in said matrix, wherein:

said reinforcements are metallic fibers made of an Fe—Cr—Si alloy consisting mainly of Fe and containing 5 to 30% of Cr and 3 to 10% of Si, said metal matrix composite is subjected to a solution-treatment at temperatures of 470° C. such that formation of intermetallic compounds on interfaces between said matrix and the reinforcements is restrained, said metallic fibers have diameters of $\phi 20\,\mu m$ to $\phi 100\,\mu m$ and irregular peripheral surfaces, and are formed by a melt extraction method, a volume content of said reinforcements ranges from 10% to 40%, and said reinforcements are preformed into a given shape by sintering.

9. A piston including a metal matrix composite comprising a matrix made of an aluminum alloy and reinforcements mixed in said matrix, wherein said reinforcements are metallic fibers made of an Fe—Cr—Si alloy consisting mainly of Fe and containing 5 to 30% of Cr and 3 to 10% of Si.

10. A piston according to claim 9, wherein said metal matrix composite is subjected to a solution-treatment at temperatures of 470° C. to 500° C. such that formation of reactants on interfaces between said matrix and the reinforcements is restrained.

11. A piston according to claim 9, wherein said metallic fibers have diameters of $\phi 20\,\mu m$ to $\phi 100\,\mu m$ and irregular peripheral surfaces, and are formed by a melt extraction method.

12. A piston according to claim 9, wherein said reinforcements are preformed into a given shape by sintering.

13. A piston including a metal matrix composite comprising a matrix made of an aluminum alloy and reinforcements mixed in said matrix, wherein:

said reinforcements are metallic fibers made of an Fe—Cr—Si alloy consisting mainly of Fe and containing 5 to 30% of Cr and 3 to 10% of Si, said metal matrix composite is subjected to a solution-treatment at temperatures of 470° C. to 500° C. such that formation of reactants on interfaces between said matrix and the reinforcements is restrained, said metallic fibers have diameters of $\phi 20\,\mu m$ to $\phi 100\,\mu m$ and irregular peripheral surfaces, and are formed by a melt extraction method, a volume content of said reinforcements ranges from 10% to 40%, and said reinforcements are preformed into a given shape by sintering.

* * * * *